United States Patent
Fukae et al.

(10) Patent No.: US 6,424,289 B2
(45) Date of Patent: Jul. 23, 2002

(54) OBSTACLE DETECTION DEVICE AND OBSTACLE DETECTION SYSTEM

(75) Inventors: Tadamasa Fukae; Kenji Morihara, both of Tokyo; Takashi Kawakami; Hiroyuki Somiya, both of Aichi, all of (JP)

(73) Assignees: Mitsubishi Denki Kabushiki Kaisha, Tokyo; Central Japan Railway Company, Nagoya, both of (JP)

( * ) Notice: Subject to any disclaimer, the term of this patent is extended or adjusted under 35 U.S.C. 154(b) by 0 days.

(21) Appl. No.: 09/870,509

(22) Filed: Jun. 1, 2001

(30) Foreign Application Priority Data

Jun. 1, 2000 (JP) .......................................... 2000-164694

(51) Int. Cl.[7] .............................................. G01S 13/93
(52) U.S. Cl. ............................. 342/27; 342/28; 342/52; 342/58; 342/70; 375/130; 375/140; 375/146; 375/147; 375/150
(58) Field of Search ................................ 342/27, 28, 70, 342/71, 72, 118, 145, 146, 147, 175, 41, 52, 53, 54–59; 375/130–153; 340/541, 552, 553–564, 540; 343/767–786, 700 MS

(56) References Cited

U.S. PATENT DOCUMENTS

| 3,947,834 | A | * | 3/1976 | Gershberg et al. | .......... | 340/554 |
|---|---|---|---|---|---|---|
| 4,562,428 | A |   | 12/1985 | Harman et al. |   |   |
| 5,724,041 | A | * | 3/1998 | Inoue et al. | ................... | 342/70 |
| 5,731,781 | A | * | 3/1998 | Reed | ........................... | 342/135 |
| 5,828,333 | A | * | 10/1998 | Richardson et al. | .......... | 342/70 |
| 5,959,571 | A | * | 9/1999 | Aoyagi et al. | ................. | 342/70 |
| 6,121,916 | A | * | 9/2000 | McDade | ...................... | 342/70 |
| 6,232,910 | B1 | * | 5/2001 | Bell et al. | ...................... | 342/70 |

FOREIGN PATENT DOCUMENTS

| GB |   | 2048536 A | 12/1980 |
| JP |   | 10-95338 A | 4/1998 |
| WO | WO 97/22955 A2 | 6/1997 |
| WO | WO 98/55972 A1 | 12/1998 |

* cited by examiner

*Primary Examiner*—Bernarr E. Gregory
(74) *Attorney, Agent, or Firm*—Leydig, Voit & Mayer, Ltd.

(57) ABSTRACT

An obstacle detection system includes a leaky transmission path, a leaky receiving path opposite to the leaky transmission path, a spread spectrum signal generator connected to an end of the leaky transmission path and generating a spread spectrum signal for radiation from the leaky transmission path to detect an obstacle. A correlator is connected to an end of the leaky receiving path to calculate a level of correlation between a reference spread spectrum signal and a spread spectrum signal received by the leaky receiving path. A detector detects an obstacle in accordance with a change in the level of correlation calculated by the correlator.

8 Claims, 7 Drawing Sheets

OBSTACLE DETECTION DEVICE AND OBSTACLE DETECTION SYSTEM

BACKGROUND OF THE INVENTION

1. Field of the Invention

The present invention relates to an obstacle detection device using a leaky transmission path such as a leaky coaxial cable, a leaky wave guide and the like, and more particularly relates to an obstacle detection device and obstacle detection system precisely detecting the presence and position of an obstacle utilizing spread spectrum technology regardless of whether the obstacle is motionless or moving.

2. Description of the Related Art

A fallen object from a traveling vehicle, a vehicle performing an emergency stop operation or the like are considered as examples of an obstacle on ordinary roads and railroad lines. Since these obstacles in a state of being motionless on the ordinary roads and railroad lines are factors causing the occurrences of a rear end collision and a double rear end collision accident, in order to prevent these occurrences, it is also necessary to promptly detect these obstacles and perform removal operations for these obstacles.

As an obstacle detection device for detecting an obstacle on the ordinary roads and railroad lines arising from the above-described request, there are obstacle detection devices which use leakage transmission paths such as a leakage coaxial cable, a leakage wave guide and the like. A brief explanation of the configurations of these leakage transmission paths will be given hereafter. A leakage wave guide is one in which multiple slots leaking and radiating a radio wave in the longitudinal direction of a wave guide comprising a conductor are provided at suitable intervals. A leakage coaxial cable has a configuration based on a principle similar to that of the leakage wave guide. A related-art obstacle detection device using a leakage coaxial cable (hereafter, referred to as LCX) will be described below.

FIG. 6 is a block diagram showing a configuration of a related-art obstacle detection device disclosed in Japanese Laid-Open Patent Application No. 10-95338. In FIG. 6, reference numeral 1' denotes a transmission LCX which is laid on one side of a road or a railroad line and provided with a plurality of slots leaking and radiating a pulse modulated signal for detection at suitable intervals in the longitudinal direction, reference numeral 2' denotes a receiving LCX which is laid on the opposing side of the transmission LCX 1' laid on the road or the railroad line and receives the radiated pulse signal from the transmission LCX 1' by a plurality of slots provided at suitable intervals in the longitudinal direction. Matched terminations are connected at far ends of the transmission LCX 1' and the receiving LCX 2' opposite to a transmitter 63 and a receiver 64, respectively. Reference numeral 63 denotes a transmitter connected to one end (near end) of the transmission LCX 1' and generating a pulse modulated signal for detecting an obstacle; reference numeral 64 denotes a receiver connected to one end (near end) of the receiving LCX 2', which end is opposite to the near end of the transmission LCX 1', and receiving the pulse modulated signal for detection from the transmission LCX 1'; reference numeral 65 denotes a portion of the receiver 64 operating as a low pass filter (hereafter, referred to as LPF) for extracting an envelope from a waveform of the pulse modulated signal for detection which has been received by the receiver 64; reference numeral 66 denotes a portion of the receiver 64 operating as a memory device for storing an envelope extracted from the waveform of pulse modulated signal for detection when an obstacle does not exist; and reference numeral 67 denotes a portion of the receiver 64 operating as a computing unit in which the difference between an envelope from a waveform of the pulse modulated signal for detection extracted by the LPF 65 and an envelope stored in the memory device 66 when an obstacle does not exist is found and the position of the obstacle is detected from the difference waveform.

A description will now be given of the operation according to the related art.

A signal for detecting an obstacle which has been pulse modulated in the transmitter 63 is outputted to the transmission LCX 1'. The inputted pulse signals in the transmission LCX 1' are in turn radiated as a radio wave from the respective slots aligned in the longitudinal direction of the transmission LCX 1'. This radio wave enters the respective slots provided in the longitudinal direction of the receiving LCX 2' opposed to the transmission LCX 1', and received by the receiver 64 with a delay corresponding to the positions of the slots. When the receiver 64 receives a radio wave from the transmission LCX 1', the LPF 65 in the receiver 64 extracts an envelope from a waveform of the pulse signal for detecting an obstacle received as a radio wave from the transmission LCX 1' and transmits the extracted envelope to the computing unit 67. The computing unit 67 reads the envelope (reference waveform) previously measured when an obstacle does not exist from the memory device 66 whenever the LPF 65 extracts an envelope from a waveform of the received signal and finds a difference waveform between the read envelope and the envelope of the waveform of the pulse modulated signal for detection which the LPF 65 has extracted. At this time, if an obstacle exists on the road or the railroad line, which intervenes between the transmission LCX 1' and the receiving LCX 2', the radio wave from the transmission LCX 1' is interrupted at its position. Therefore, if an obstacle exists, a reception level of a radio wave received by the receiving LCX 2' from the transmission LCX 1' is reduced by a certain degree, irrespective of the field intensity provided by the transmission LCX 1'. Owing to this, since a change corresponding to the obstacle appears in the difference waveform calculated by the computing unit 67, the presence of the obstacle can be detected.

Since the related-art obstacle detection device is configured as described above, and because the coupling loss of a signal transmitted via a LCX is large, the received S/N ratio of the pulse modulation signal that the receiver 64 receives is small and the reference waveform used during the detection of an obstacle varies, resulting in a problem that an obstacle could not be detected with the sufficient precision to satisfy reliability demands.

The above-described problem will be concretely described below.

FIGS. 7A–7H are graphical representations showing a transmitted waveform and received waveform of a related-art obstacle detection device described above. FIG. 7A shows a waveform of a pulse modulated signal for detecting an obstacle outputted to the transmitting LCX 1' by the transmitter 63. FIG. 7B shows an ideal waveform of a signal received by the receiver 64 via the receiving LCX 2' without considering factors such as the coupling loss and noise of LCX, FIG. 7C shows a waveform of a signal received by the receiver 64 via the receiving LCX 2' in consideration of the coupling loss of LCX, FIG. 7D shows an envelope extracted from a signal waveform of FIG. 7C, FIG. 7E shows an observed waveform of a received signal by the receiver 64 via the receiving LCX 2', FIG. 7F shows an envelope extracted from the waveform of FIG. 7E, FIG. 7G shows a waveform when the noise is added to a signal received by the receiver 64, and FIG. 7H shows an envelope from the signal waveform of FIG. 7G.

A signal outputted from the transmitter 63 to the receiving LCX 1' is pulse modulated and shows a sinusoidal waveform as shown in FIG. 7A. This signal is radiated as a radio wave and inputted into the receiver 64 via the receiving LCX 2'. A radio wave from the receiving LCX 1' is a waveform as shown in FIG. 7B when factors such as the coupling loss and noise of LCX are not considered; i.e. a succession of pulse modulated signals of FIG. 7A with mutual delays corresponding to respective positions of the slots.

Since the coupling loss to a signal transmitted via the LCX exists in a LCX and the coupling loss is not uniform in the longitudinal direction. When considering the coupling loss of LCX, the waveform becomes as shown in FIG. 7C wherein an amplitude is varied. Moreover, the envelope extracted from the signal waveform shown in FIG. 7C has a waveform as shown in FIG. 7D.

However, since actually the coupling loss of LCX is large, in the case where one pulse modulated signal is received by the receiver 64, the waveform is not as shown in FIG. 7C. A waveform as shown in FIG. 7E, wherein the reception level and reception SN ratio are low, is observed. When such a signal passes through the LPF 65, an envelope as shown in FIG. 7F is extracted and stored in the memory device 66.

After a signal waveform shown in FIG. 7E is observed, a waveform as shown in FIG. 7G, instead of the waveform as shown in FIG. 7C, may be observed in a state in which there is no obstacle. This happens when noise is added to the signal. owing to this, an envelope extracted from a signal waveform shown in FIG. 7G by the LPF 65 has a waveform as shown in FIG. 7H. Therefore, an envelope shown in FIG. 7F previously stored in the memory device 66 and an envelope shown in FIG. 7H have different waveforms, and if a difference calculation is performed using an envelope previously stored in the memory device 66 as the reference waveform, there may be the possibility that error detection will occur. Thus, since the reference waveform used to detect an obstacle varies depending upon the conditions at the time of measurement, there has been a problem that an obstacle could not be detected with sufficient precision to ensure reliable performance.

The variation of the reference waveform can be solved by performing integration for multiple measurements. While this approach is effective for an obstacle in a state of being motionless, since the measurement time period is longer, for example, it is not effective for a moving obstacle such as a person straying onto a railroad line and so forth. Therefore, there has been a problem that a moving obstacle could not be detected by the related-art obstacle detection devices.

Furthermore, there has been a problem that a related-art obstacle detection device is susceptible to jamming.

To describe this in further detail, given that an input electric power from the transmission LCX 1' of the receiver 64 is P1 Watts (hereafter, referred to as W) and an input jamming electric power for the receiver 64 is P2 (W), a DU ratio which is an electric power ratio of a jammer with respect to the desired radio wave of the receiver 64 of the obstacle detection device is expressed by DU=10 log (P1/P2). In the case where the jam is strong and the equality of P1=P2 is satisfied, the DU ratio becomes 0 (zero) from the above-described expression, the receiver 64 falls into a state of not being capable of receiving a radio wave from the receiving LCX 1'.

As a problem apart from the above-described problems, there is a problem that a wireless communication device cannot be used in the detection area where an obstacle detection device detects an obstacle.

To describe this in further detail, given that a radiating electric power of a radio wave from the transmission LCX 1' is P3 (W) and an input electric power of the wireless communication device in the detection area of the obstacle detection device is P4 (W), a DU ratio which is an electric power ratio of the radio wave from the transmission LCX 1' with respect to the desired radio wave of the above-described wireless communication device is expressed by DU=10 log (P4/P3). In the case where the jam is strong and the equality P3=P4 is satisfied, the DU ratio becomes 0 (zero) from the above-described expression.

Moreover, since the detection of an obstacle is performed by utilizing an envelope which is an output from the LPF 65 located within the receiver 64 in a related-art obstacle detection device, it is not possible to discriminate between slots of the transmission LCX' to determine a slot responsible for radiating the pulse-modulated signal. Therefore, there has been a problem that precise detection of an obstacle's position could not be performed.

Moreover, in an obstacle detection system configured by providing multiple related-art obstacle detection devices, there has been a problem that interference between pulse modulated signals occurs where the obstacle detection devices were adjacent to each other, resulting in a failure to detect the obstacle.

Furthermore, in an obstacle detection system configured by providing a plurality of related-art obstacle detection devices, it has been required-that an electric power source supplying device for supplying the electric power source to the obstacle detection devices which constitute the system were provided in every obstacle detection device. The problem of increases in manufacturing costs has resulted due to the necessity to provide for installation space for electricity supply devices.

Finally, there has been a problem that information could not be precisely transmitted depending upon the laid location of LCX when an information measured by an obstacle detection device was transmitted as a wireless signal to the other obstacle detection device. To describe this in further detail, if the LCX is laid on the surroundings of mountains or buildings and so forth, for example, there may be the possibility that the quality of communication is deteriorated because the wireless signal undergoes multiple reflections.

SUMMARY OF THE INVENTION

Accordingly, an object of the present invention is to obtain an obstacle detection device capable of precisely detecting the presence and position of an obstacle regardless of the whether the obstacle is motionless or moving, by utilizing the spread spectrum technology.

A further object of the present invention is to obtain an obstacle-detection in which the interference of signals for detecting an obstacle between adjacent obstacle detection devices is suppressed, a leakage transmission path is used to supply an electric source to the respective devices, and information is transmitted between devices, by utilizing spread spectrum technology.

The aforementioned objects can be achieved by an obstacle detection device, comprising: signal transmitting and receiving means for detecting an obstacle, comprising a first leakage transmission path on the transmitting side for radiating a signal for detection of an obstacle and a second leakage transmission path provided opposite to the first leakage transmission path and receiving the signal for detection of an obstacle; spread spectrum signal transmitting means connected to one end of the first leakage transmission path, for generating the spread spectrum signal for detecting an obstacle based on a spread code and causing the first leakage transmission path to radiate the spread spectrum signal for detection of an obstacle; and spread spectrum signal receiving means connected to one end of the second leakage transmission path, which end is the opposite to where the spectrum signal transmitting means is connected to the first leakage transmission path, wherein the spread spectrum signal receiving means further comprises: reference spread spectrum signal generation means for generating a reference spread spectrum signal based on a spread code of a code series identical to that used by the spread spectrum signal transmitting means; correlation means for calculating a level of correlation between the reference spread spectrum signal generated by the reference spread spectrum signal generation means and the spread spectrum signal for detection of an obstacle received by the second leakage transmission path, based on spread code phase-locked to the spread code of the spread spectrum signal for detection of an obstacle detected by the second leakage transmission path; and detection means for detecting an obstacle based on a change of a correlation level calculated by the correlation means.

The spread-spectrum signal receiving means may comprise time measurement means for measuring a spread spectrum signal propagation time period elapsing from the time when the spread spectrum signal transmitting means generates the spread spectrum signal for detection of an obstacle until the time when the correlation means is capable of calculating a correlation level of the both spread spectrum signals subsequent to generation, by the reference spectrum signal generation means, of the reference spread spectrum signal which is in synchronization with the spread code of the spread spectrum signal for detection of an obstacle, and the detection means may detect a position of an obstacle existing within an obstacle detection area formed by the signal transmitting and receiving means for detecting an obstacle, based on the spread spectrum signal propagation time period measured by the time measurement means.

The spread spectrum signal receiving means may have delaying means for delaying a phase of the spread code used by the reference spread spectrum signal generation means with respect to the spread spectrum signal for detection of an obstacle generated by the spread spectrum signal transmitting means by a desired time period.

The aforementioned objects can also be achieved by an obstacle detection system comprising: a plurality of obstacle detection devices according to at least one of claims 1 through 3, wherein adjacent devices generate spread spectrum signals based on different spread codes.

The aforementioned objects can also be achieved by an obstacle detection system comprising: a plurality of obstacle detection devices according to at least one of claims 1 through 3, wherein the obstacle detection devices are connected via leakage transmission paths, each of the obstacle detection devices comprising: synthesizing means for generating a superimposed signal by superimposing an electric power on the spread spectrum signal for detection of an obstacle and transmitting the superimposed signal to the adjacent device via the leakage transmission path, and isolating means for isolating the electric power and the spread spectrum signal from the superimposed signal generated by the synthesizing means, and supplying the electric power to the obstacle detection device.

The adjacent devices may generate spread spectrum signals based on different spread codes.

The obstacle detection devices may be connected via the leakage transmission paths and are provided with information transmitting and receiving means for transmission and reception of detection information between the obstacle detection devices.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Embodiment 1

Figure 1:
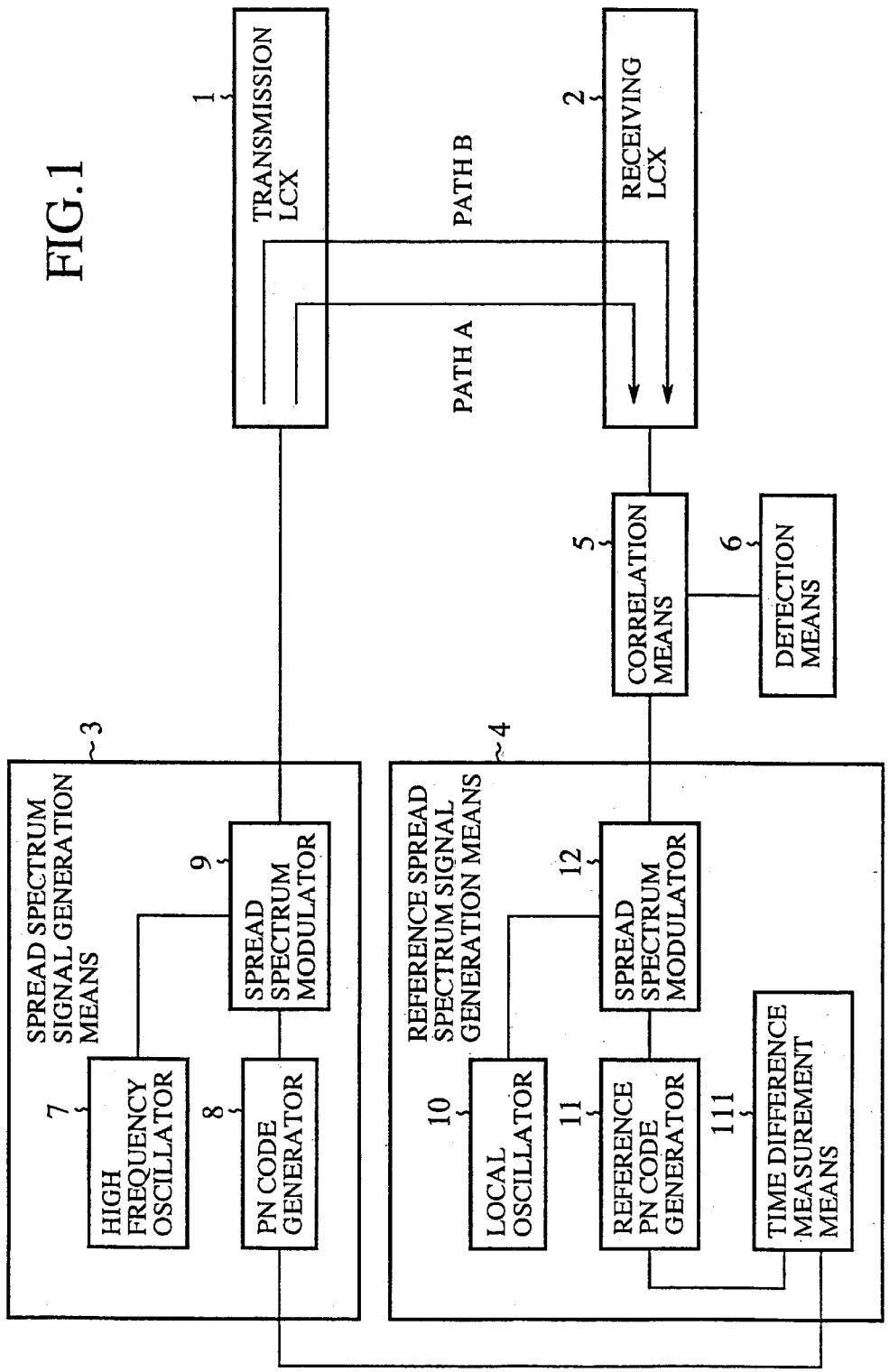
FIG. 1 is a block diagram showing a configuration of an obstacle detection device according to Embodiment 1 of the present invention.

FIG. 1 is a block diagram showing a configuration of an obstacle detection device according to the present invention. In FIG. 1, reference numeral 1 denotes a transmission LCX (leakage transmission path, signal transmitting and receiving means for detecting an obstacle) which is laid on one side of a road or a railroad line and in which a plurality of slots leaking and radiating spread spectrum signals for detection of an obstacle generated by a spread spectrum signal generation means 3 are provided at suitable intervals in the longitudinal direction; and reference numeral 2 denotes a receiving LCX (leakage transmission path, signal transmitting and receiving means for detecting an obstacle) which is laid on the side opposing to the transmission LCX 1 and in which spread spectrum signals for detection of an obstacle radiated from the transmission LCX 1 are received by a plurality of slots provided at suitable intervals in the longitudinal direction. Reference numeral 3 denotes a spread spectrum signal generation means (spread spectrum signal transmitting and receiving means) connected to one end of the transmission LCX 1 and generating a spread spectrum signal for detection of an obstacle so as to cause the transmission LCX 1 to radiate the signal; reference numeral 4 denotes a reference spread spectrum signal generation means for generating a reference spread spectrum signal on the basis of a code phase-locked to and of the same code series as the code series of the spread spectrum signal for obstacle detection received by the receiving LCX 2; reference numeral 5 denotes a correlation means (spread spectrum signal receiving means) connected to an end of the receiving LCX 2 opposite to the end of the transmission LCX 1 to which end the spread spectrum signal generation means 3 is connected and calculating a level of correlation between the reference spread spectrum signal and the spread spectrum signal for detection of an obstacle received by the receiving LCX 2, and reference numeral 6 denotes a detecting means (spread. spectrum signal receiving means) for detecting an obstacle from a change in correlation level calculated by the correlation means 5.

Reference numeral 7 denotes a high frequency oscillator (spread spectrum signal transmitting means) constituting the spread spectrum signal generation means 3, for generating a high frequency signal serving as a signal source of a spread spectrum signal for detection of an obstacle; reference numeral 8 denotes a PN code generator (spread spectrum signal transmitting means) for generating a pseudo random noise code (hereinafter, referred to as a PN code) for modulating the high frequency signal generated by the high frequency oscillator 7 to produce a spread spectrum signal for detection of an obstacle; reference numeral 9 denotes a spread spectrum modulator (spread spectrum signal transmitting means) for modulating the high frequency signal generated by the high frequency oscillator 7 on the basis of the PN code generated by the PN code generator 8 to produce a spread spectrum signal for detection of an obstacle.

Reference numeral 10 denotes a local oscillator (reference spread spectrum signal generation means, spread spectrum signal receiving means) constituting spread spectrum signal generation means 4, for generating a high frequency signal having the same phase as the high frequency-signal generated by the high frequency oscillator 7 and serving as a signal source of a reference spread spectrum signal; reference numeral 11 denotes a reference PN code generator (reference spread spectrum signal generation means, spread spectrum signal receiving means) for generating a PN code for modulating the high frequency generated by the local oscillator 10 to produce a reference spread spectrum signal and generating a PN code phase-locking to and of the same code series as PN code of the spread spectrum signal for detection of an obstacle received by the receiving LCX 2. Reference numeral 12 denotes a spread spectrum modulator (reference spread spectrum signal generation means, spread spectrum signal receiving means) constituting the reference spread spectrum signal generation means 4, for modulating the signal generated by the local oscillator 10 on the basis of the PN code generated by the reference PN code generator 11 to produce the reference spread spectrum signal; and reference numeral 111 denotes a time difference measurement means (time measurement means, spread spectrum signal receiving means) for measuring a time difference (spread spectrum signal propagation time period), for detection of the position of an obstacle between the LCX 1 and the LCX 2, between generation of a PN code by the PN code generator 8 and generation by the reference PN code generator 11.

A description will now be given of the operation according to Embodiment 1.

First, an operation of transmitting a spread spectrum signal for detection of an obstacle will be described. The high frequency oscillator 7 generates a high frequency signal serving as a signal source of a spread spectrum for detection of an obstacle so as to feed the high frequency signal to the spread spectrum modulator 9. A PN code for spread spectrum modulation is supplied by the PN code generator 8 to the spread spectrum modulator 9. The high frequency signal generated by the high frequency oscillator 7 is spread spectrum modulated in the spread spectrum modulator 9 on the basis of the PN code supplied from the PN code generator 8.

Spread spectrum modulation carried out in the spread spectrum modulator 9 may utilize the existing spread spectrum technology such as a direct spread method (DS method) distributing a signal electric power over a wide frequency band by multiplying a high frequency signal by a PN code, or a frequency hopping method. (FH method) broadening the frequency band by switching between high frequencies having different center frequencies according to a pattern of PN code using a frequency synthesizer and the like capable of frequency change-over at a high speed.

When a spread spectrum signal for detection of an obstacle is generated by the spread spectrum modulator 9, it is transmitted to the transmission LCX 1 connected to the spread spectrum signal generation means 3. The transmission LCX 1 is provided with a plurality of slots at suitable intervals in the longitudinal direction so that spread spectrum signals for detection of an obstacle are radiated as a radio wave from these slots. The spread spectrum signal for detection of an obstacle radiated as a radio wave is propagated over a area for detection of an obstacle between the transmission LCX 1 and the receiving LCX 2 before being received by the receiving LCX 2. Due to differences in position of the respective slots, spread spectrum signals for detection of an obstacle propagates via different paths including a path A and a path B as shown in FIG. 1. Furthermore, spread spectrum signals for detection of an obstacle traveling these different paths are received in the receiving LCX 2 in a superimposed manner.

A spread spectrum signal for detection of an obstacle received by the receiving LCX 2 is immediately inputted into the correlation means 5. Moreover, a reference spread spectrum signal generated by the reference spread spectrum signal generation means 4 is inputted into the correlation means 5. Now, a generation operation of a reference spread spectrum signal generated by the reference spread spectrum signal generation means 4 will be described. Within the reference spread spectrum signal generation means 4, the local oscillator 10 generates a high frequency signal identical to the high frequency signal generated by the high frequency oscillator 7 and serving as a signal source of the reference spread spectrum signal. The local oscillator inputs the high frequency to the spread spectrum modulator 12. Moreover, in the reference PN code generator 11, a PN code for performing spread spectrum of the high frequency signal generated by the local oscillator 10 is generated. This PN code is a PN code of the code series identical with that of the PN code of the spread spectrum signal generation means 3. The reference PN code generator 11 performs spread spectrum modulation of the high frequency signal generated by the local oscillator 10 on the basis of the PN code thus generated. The spread spectrum operation in this reference PN code generator 11 is similar to the operation performed by the spread spectrum modulator 12 described above.

For example, spread spectrum signals for detection of an obstacle traveling different paths A, B as shown in FIG. 1, are received in the receiving LCX 2 in a superimposed manner. However, by synchronization the phase of the PN code used to generate the spread spectrum signal for detection of an obstacle traveling path A with the phase of the PN code used to generate the reference spread spectrum signal by the reference spread spectrum signal generation means 4, calculation of a correlation level in the correlation means 5 enables isolation of the spread spectrum signal for detection of an obstacle traveling path B from the spread spectrum signal for detection of an obstacle traveling path A.

To describe this in further detail, when the spread spectrum signal generation means 3 generates the spread spectrum signal for detection of an obstacle, it is immediately outputted to the transmission LCX 1. The spread spectrum signal for detection of an obstacle is propagated within the transmission LCX 1 and radiated from the slot of the transmission LCX 1 provided at the position corresponding to the path A. This spread spectrum signal for detection of an obstacle is received via the slot of the receiving LCX 2 opposing to the slot position of the above-described transmission LCX 1. Accordingly, the level of correlation between the received signal and the reference spread spectrum signal is calculated in the correlation means 5. By measuring a time that elapses between the transmission of the spread spectrum signal for detection of an obstacle from the spread spectrum signal generation means 3, subsequent to the supply of the PN code from the PN code generator 8 to the spread spectrum modulator 9, and the supply of the reference spread spectrum signal, generated by the reference spread spectrum signal generation means 4, to correlation means 5 subsequent to the reception of the spread spectrum signal for detection of an obstacle by the reception LCX 2 and to the supply of the PN code, phase-locked to the PN code generated by the PN code generator 8, from the reference PN code generator 11 to the spread spectrum modulator 12, the time required for transmission and reception of the spread spectrum signal for detection of an obstacle can be approximated.

Hence, in an obstacle detection device according to Embodiment 1, the time difference measurement means 111 for measuring a time difference between the generation of the PN code by the PN code generator 8 and the generation of the PN code by the reference PN code generator 11 is provided. owing to this, for example, supposing that a time elapsing from the time when the spread spectrum signal for detection of an obstacle is radiated from the transmitting end of the transmission LCX 1 and travel path A until the time when the spread spectrum signal is received by the receiving LCX 2 so that the correlation level between this signal and the reference spread spectrum signal is calculated by the correlation means 5, is t1 (sec.) (i.e., a time difference between the generation time of a PN code of the PN code generator 8 and the generation time of a PN code of the reference PN code generator 11 is t1 (sec.)), it is understood path A is a path passing a position located at a distance of t1×c/2 (m) (where c is the speed of light) away from the transmitting end of the transmission LCX 1. A propagating speed of the spread spectrum signal for detection of an obstacle is calculated by multiplying the time difference t1 measured by the time difference measurement means 111 approximately corresponding to a time elapsing from the time when the spread spectrum signal for detection of an obstacle travels from the transmitting end of the transmission LCX 1 until the time when the signal reaches the reference spread spectrum signal generation means 4 of the receiving LCX 2 by c corresponding to the propagation speed of the spread spectrum signal for detection of an obstacle. Since the transmission LCX 1 and the receiving LCX 2 are opposed to each other and the end portion to which the spread spectrum signal generation means 3 is connected faces the end portion to which the reference spread spectrum signal generation means 4 is connected, a half distance of the propagation distance of the spread spectrum signal for detection of an obstacle is considered as a propagated distance from the transmitting end of the transmission LCX 1.

While level of correlation between the spread spectrum signal for detection of an obstacle traveling path A and the reference spread spectrum signal input to the correlation means 5 after an elapse of time t1 corresponding to path A since the transmission of the spread spectrum signal for detection of an obstacle from the spread spectrum signal generation means 3, the PN code of the spread spectrum signal for detection of an obstacle traveling path B and the PN code of the reference spread spectrum signal input to the correlation means 5 after an elapse of time t1 are not in phase. Therefore, the level of correlation between the signal traveling path B and the reference signal is approximately zero.

To describe this further, an obstacle detection device according to Embodiment 1 detects the spread spectrum signal for detection of an obstacle by synchronous detection. Therefore, a reference spread spectrum signal is generated as a result of regenerating the spread spectrum signal for detection of an obstacle. In the correlation means 5, the spread spectrum signal for detection of an obstacle and the reference spread spectrum signal are multiplied so that the spread spectrum signal for detection of an obstacle is demodulated. The result of multiplication is output as a correlation level to the detection means 6. In the case where the PN code of the signal (for example, the signal traveling path B) for detection of an obstacle is not in synchronization with that of the reference spread spectrum signal, the product of PN codes of the spread spectrum signal for detection of an obstacle and the reference spread spectrum signal is approximately 0 (zero) as a result of performing multiplication. A PN code takes one of two values 0, 1 periodically so that the product of PN codes of signals out of phase with respect to each other becomes 0 (zero).

Correlation levels are inputted from the correlation means 5 to the detection means 6 while detection of an obstacle is being carried out. If an obstacle appears between the transmission LCX 1 and the receiving LCX 2, the intensity of the spread spectrum signal for detection of an obstacle is lowered and a change of the correlation level occurs. Therefore, the detection means 6 can detect the presence and location of the obstacle.

First, a description will be given how the reception SN ratio is enhanced compared to that of the related-art obstacle detection device. In the case where a pulse modulated signal is used as a signal for detecting an obstacle, a pulse modulated signal received by a receiver is expressed by S×cos ωt, wherein S indicates a signal level of a pulse modulated signal inputted into the receiver and ω indicates a carrier wave frequency. Given that an interval between pulses of the pulse-modulated signal is T, the length of LCX 1, 2 is L (m), the interval between the transmission LCX 1 and the receiving LCX 2 opposite to each other is H (m), and the speed of light is c, the minimum value of T is expressed by (2 L+H)/c, i.e. the propagated distance of the pulse modulated signal divided by the speed of light. A signal level of the receiving pulse modulated signal at an integral time T becomes S (c>>(2L+H) so that (2L+H)/c is approximately 0; cos ωT=1).

In contrast to this, in an obstacle detection device according to Embodiment 1, a spread spectrum signal is used.

Given that the length of one cycle of a PN code is N and a duration of one bit of a PN code is Tc, the minimum value of the pulse repetition time interval of a code series of a PN code N×Tc can be made to be identical with a pulse repetition time interval of the above-described pulse modulated signal. Now, a PN code is expressed as a function PN (t) where time t is a variable. When the spectrum spreading according to the DS method is used, the spread spectrum is expressed by S×PN (t)×cos ωt. When the PN code of a spread spectrum signal for detection of an obstacle and the PN code of a reference spread spectrum signal. are synchronized, the above-described spread spectrum signal S×PN (t)×cos ωt may be multiplied by a PN code of a reference spread spectrum signal so as to demodulate the spread spectrum signal for detection of an obstacle to reproduce the original pulse modulated signal. The received signal for detecting an obstacle is expressed by S×PN (t)×PN (t)×cos ωt. Since the integral action time N×Tc=T becomes PN (t)×PN (t)=N, and accordingly, the signal level of the receiving signal becomes S×N. Thus, in an obstacle detection device according to Embodiment 1, a signal level is N-folded compared to that of the related-art obstacle detection device, it is understood that SN ratio is enhanced to N-fold. Put another way, the SN ratio of one piece of the pulse signal is multiplied N-fold in the same integral time by employing a spread spectrum signal as a carrier wave, thereby being capable of shortening the time of observing and measuring an obstacle and also capable of sufficiently applying to the detection of a moving obstacle.

Next, a description will be given of how the anti-jamming performance is enhanced compared to that of the related-art obstacle detection device. Given that an input electric power of a radio wave from the transmission LCX 1 of an obstacle detection device according to Embodiment 1 is P1 (W), an input electric power of a jammer is P2 (W) and the length of one cycle of PN code is N, when the equality of P1=P2 is satisfied, an input electric power of a jammer is suppressed to P2/N, so that the DU ratio becomes 10 log (N). Since the length of one cycle of a PN code N has in general a value of 1000 or more, the DU ratio is improved by 30 dB or more.

Next, a description will be given of how the obstacle detection according to Embodiment 1 does not affect the communication in the other wireless communication devices existing within the detection area. When a wireless communication device conducts a communication within the detection area of an obstacle detection device according to Embodiment 1, given that the bandwidth of a spread spectrum signal is B1 (Hz), the bandwidth of the wireless communication device is B2 (Hz), the electric power density of a spread spectrum signal is spread over a broad frequency range so that B1>>B2. Even if the total electric power of the spread spectrum signal and the value of the electric power of a signal to be inputted into the wireless communication device are identical, the jammer electric power for the wireless communication device is reduced by 10 log (B1/B2). In general, since B1 is 1,000 times as high as B2, the quality of communication in the wireless communication device is improved by 30 dB or more. With this, the wireless communication device can successfully conduct a communication within the obstacle detection area of an obstacle detection device according to Embodiment 1.

As described above, up to this point, according to this Embodiment 1, there is provided an obstacle detection device, comprising: signal transmitting and receiving means for detecting an obstacle, comprising a first leakage transmission path on the transmitting side for radiating a signal for detection of an obstacle and a second leakage transmission path provided opposite to the first leakage transmission path and receiving the signal for detection of an obstacle; spread spectrum signal transmitting means connected to one end of the first leakage transmission path, for generating the spread spectrum signal for detecting an obstacle based on a spread code and causing the first leakage transmission path to radiate the spread spectrum signal for detection of an obstacle; and spread spectrum signal receiving means connected to one end of the second leakage transmission path, which end is the opposite to where the spectrum signal transmitting means is connected to the first leakage transmission path, wherein the spread spectrum signal receiving means further comprises: reference spread spectrum signal generation means for generating a reference spread spectrum signal based on a spread code of a code series identical to that used by the spread spectrum signal transmitting means; correlation means for calculating a level of correlation between the reference spread spectrum signal generated by the reference spread spectrum signal generation means and the spread spectrum signal for detection of an obstacle received by the second leakage transmission path, based on spread code phase-locked to the spread code of the spread spectrum signal for detection of an obstacle detected by the second leakage transmission path; and detection means for detecting an obstacle based on a change of a correlation level calculated by the correlation means. Accordingly, it is possible to provide an obstacle detection device capable of detecting an obstacle accurate accurately, less affected by jamming without jamming communication in a wireless communication device within an area for detection of an obstacle. Since the time required for detection of an obstacle is reduced as compared to the related art, it is possible to detect a moving obstacle.

Moreover, according to this Embodiment 1, there is provided a time measurement means for measuring a spread spectrum signal propagation time period elapsing from the time when the spread spectrum signal transmitting means generates the spread spectrum signal for detection of an obstacle until the time when the correlation means is capable of calculating a correlation level of the both spread spectrum signals subsequent to generation, by the reference spectrum signal generation means, of the reference spread spectrum signal which is in synchronization with the spread code of the spread spectrum signal for detection of an obstacle. The detection means detects a position of an obstacle existing within. an obstacle detection area formed by the signal transmitting and receiving means for detecting an obstacle, based on the spread spectrum signal propagation time period measured by the time measurement means. Accordingly, removal of an obstacle from an area for detection of an obstacle is facilitated.

Embodiment 2

A device according to Embodiment 2 is provided with a delaying means for delaying a phase of a spread code used by the reference spread spectrum signal generation means by a desired time period with respect to a spread spectrum signal for detection of an obstacle generated by the spread spectrum signal transmitting means.

Figure 2:
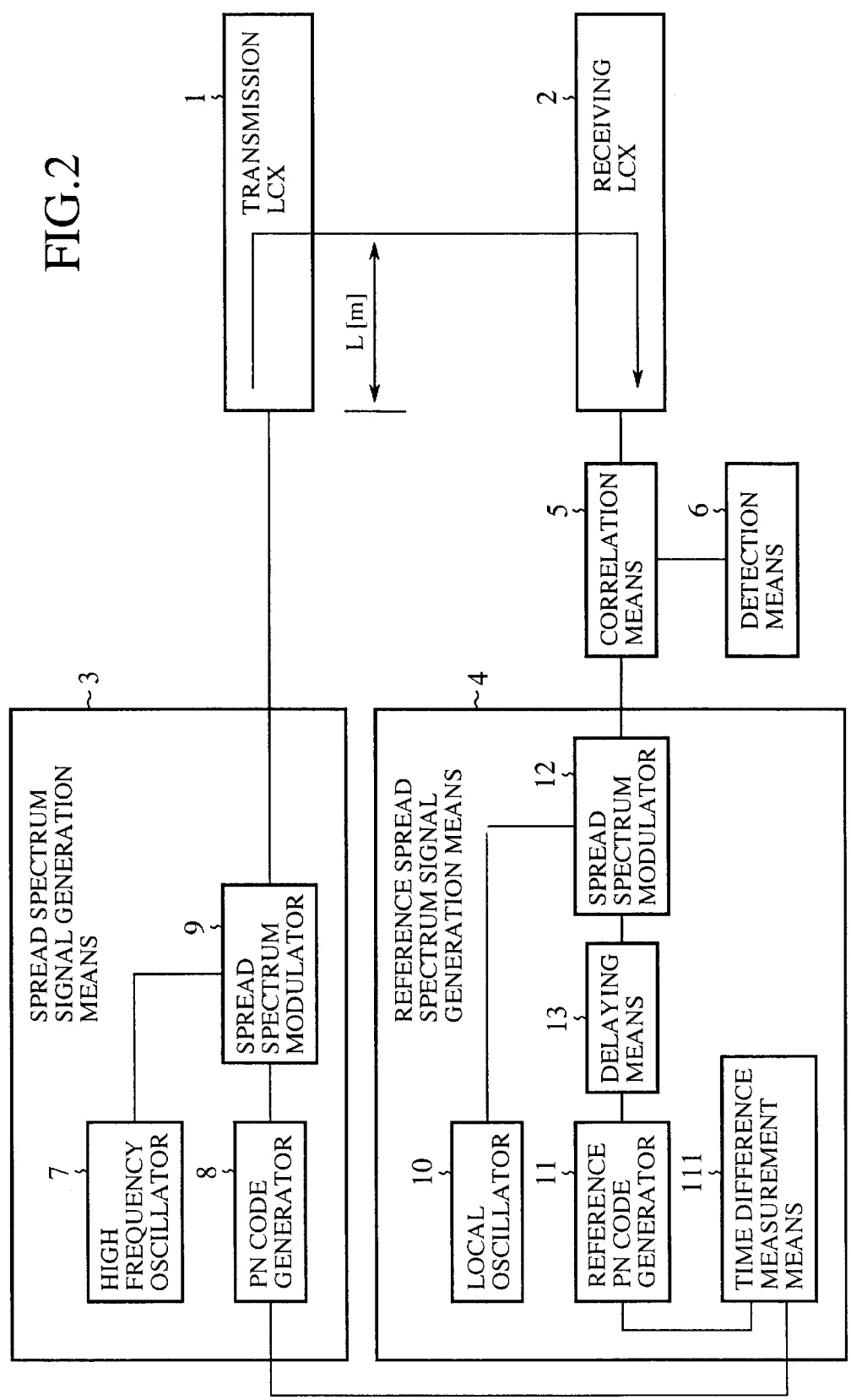
FIG. 2 is a block diagram showing a configuration of an obstacle detection device according to Embodiment 2 of the present invention.

FIG. 2 is a block diagram showing a configuration of an obstacle detection device according to Embodiment 2 of the present invention. In FIG. 2, the reference numeral 13 denotes a delaying means for delaying a phase of a PN code used by the reference spread spectrum signal generation means 4 by a desired time period with respect to a PN code generated by the PN code generator 8. It should be noted that the identical reference numerals are attached to the same components as those in FIG. 1 and additional description is omitted.

A description will now be given of the operation according to Embodiment 2.

As to operations such as generation, transmission and receiving, and detection of a spread spectrum signal for detection of an obstacle, additional description is omitted because these operations are similar to those of the above-described Embodiment 1. Hereafter operations which are different from those of the above-described Embodiment 1 will be described.

The obstacle detection device according to this Embodiment 2 is capable of detecting an obstacle located at any position within the obstacle detection area formed by the transmission LCX 1 and the receiving LCX 2. To describe this in further detail, as shown in FIG. 2, when the level of reception at a position removed by L (m) from an end of the transmission LCX connected to the spread spectrum. signal generation means 3 is to be measured on a continuous basis, the delay time is set by the delaying means 13 so as to delay the phase of the PN code used by reference spread spectrum signal generation means 4 by $\tau=2L/c$ (where c indicates the speed of light) with respect to the phase of the PN code generated by the PN code generator 8 (i.e. the PN code used to produce the spread spectrum signal generated by the spread spectrum signal generation means 3 for detection of an obstacle) With this, the phase of the PN code for the reference spread spectrum signal is in synchronization only with the spread spectrum signal for detection of an obstacle received via point removed by L (m) from said end. Therefore, only the results of detection at point L (m) away from said end can be obtained by the correlation means 5.

As described above, the device according to Embodiment 2 is provided with the delaying means 13 for delaying the phase of the PN code used by the reference spread spectrum signal generation means 3 with respect to the spread spectrum signal for detection of an obstacle by a desired time period. Accordingly, in addition to the same advantage as provided by Embodiment 1, an added advantage is provided by applying Embodiment 2 to the construction of Embodiment 1 in that any desired point in an area for detection of an obstacle is subject to observation by setting a desired delay time.

Embodiment 3

According to Embodiment 3, an obstacle detection system comprises a plurality of obstacle detection devices such that adjacent devices generate spread spectrum signals on the basis of different spread codes.

Figure 3:
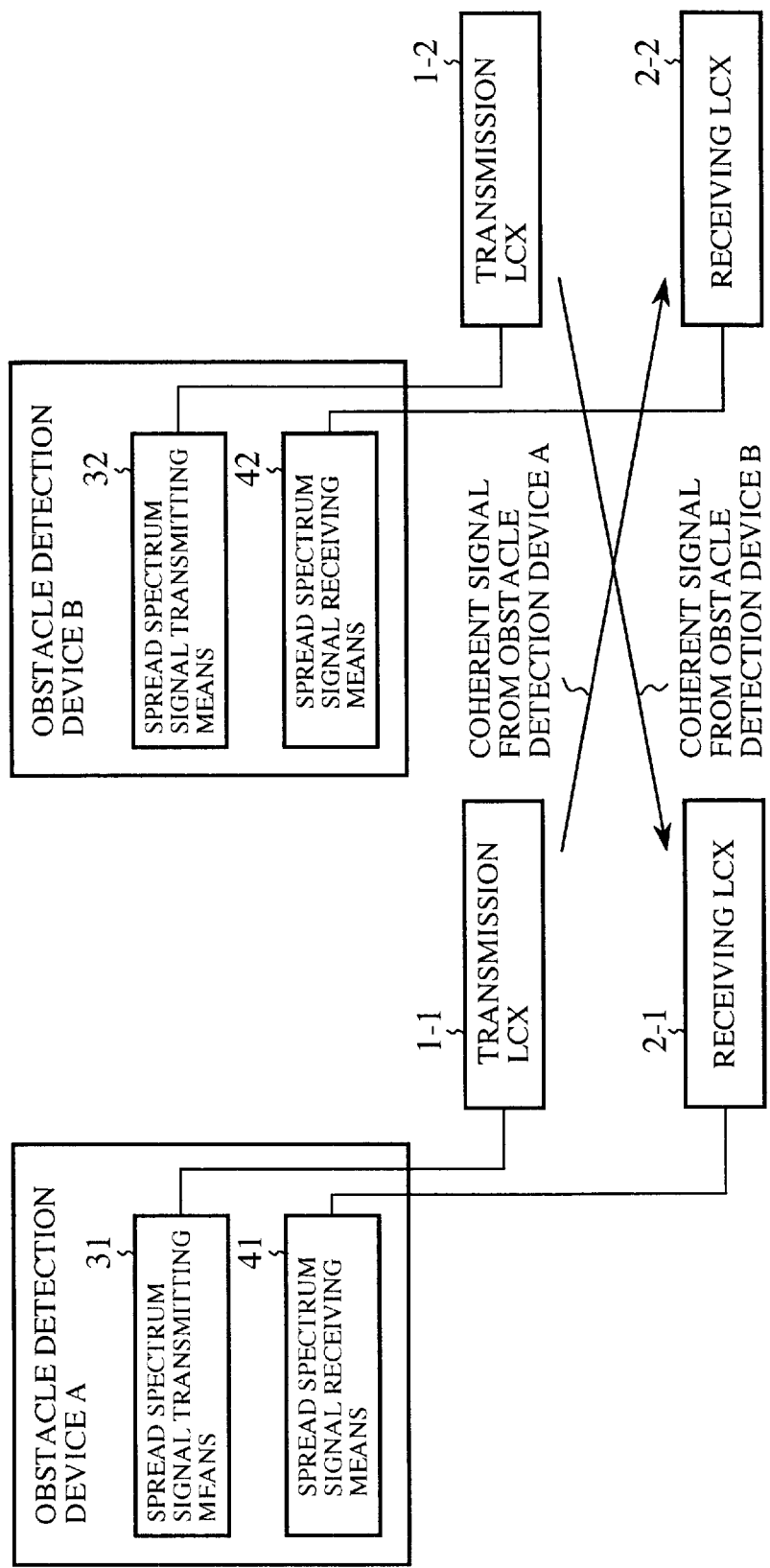
FIG. 3 is a block diagram showing a configuration of an obstacle detection device according to Embodiment 3 of the present invention.

FIG. 3 is a block diagram showing a configuration of an obstacle detection system according to Embodiment 3 of the present invention. In FIG. 3, reference numerals 1-1 and 1-2 indicate transmission LCXs (leakage transmission path on the transmitting side; signal transmitting and receiving means for detecting an obstacle) provided in obstacle detection devices A and B arranged to be adjacent to each other, respectively, reference numerals 2-1 and 2-2 indicate receiving LCXs (leakage transmission path; signal transmitting and receiving means for detecting an obstacle) provided in the obstacle detection devices A and B, respectively, and reference numerals 31 and 32 indicate spread spectrum signal transmitting means provided in obstacle detection devices A and B, respectively, and corresponding to the spread spectrum signal generation means 3 described in Embodiment 1. Reference numerals 41 and 42 indicate spread spectrum signal receiving means provided in obstacle detection devices A and B, respectively, and corresponding to the spread spectrum signal generation means 3, the correlation means 5 and the detection means 6 described in Embodiment 1 and/or Embodiment 2. Moreover, the obstacle detection devices A and B are equivalent to the obstacle detection devices described in Embodiment 1 and/or Embodiment 2 and use a PN code A and a PN code B which are different PN codes, respectively, in order to generate a spread spectrum signal for detection of an obstacle.

An obstacle detection system according to this Embodiment 3 consists of obstacle detection devices A and B. which are arranged to be adjacent to each other. Since a detecting operation of an obstacle of the obstacle detection devices A and B is similar to that of the above-described Embodiments, additional description is omitted, and the characteristics of the obstacle detection system according to Embodiment 3 will be described. The obstacle detection devices A and B arranged to be adjacent to each other radiate spread spectrum signals for detection of an obstacle from the transmission LCXs 1-1 and 1-2, respectively. A signal radiated from the transmission LCX 1-1 of the obstacle detection device A is a interfering signal with respect to the signal to be received by the receiving LCX 2-2 of the obstacle detection device B, and a signal radiated from the transmission LCX 1-2 of the obstacle detection device B is an interfering signal with respect to the signal to be received by the receiving LCX 2-1.

In an obstacle detection system according to Embodiment 3, the spread spectrum signal transmitting means 31 and 32 of the obstacle detection devices A and B, respectively, are configured to generate spread spectrum signals for detection of an obstacle using a PN. code A and a PN code B different therefrom, respectively. With this, even if a signal radiated from the transmission LCX 1-1 of the obstacle detection device A is received by the receiving LCX 2-2 of the obstacle detection device B, no problem is presented since the spread spectrum signal receiving means 42 located within the obstacle detection device B calculates a level of correlation between the received signal and a spread spectrum signal generated based on the PN code in synchronization with the phase of a PN code B. Even if a signal radiated from the transmission LCX 1-2 of the obstacle detection device B is received by the receiving LCX 2-1 of the obstacle detection device A, no problem is presented since the spread spectrum signal receiving means 41 located within the obstacle detection device A calculates a level of correlation between the received signal and a spread spectrum signal generated based on the PN code in synchronization with a phase of a PN code A. Given that the code series length of a PN code (length of one cycle) is N, the level of correlation between the PN code A and the PN code B is determined as 1/N, according to the characteristic of a PN code. Since N is, in general, 1,000 or more, the interference of spread spectrum signals for detection of an obstacle between the adjacent obstacle detection devices A and B can be almost all ignored.

As described above, according to this Embodiment 3, in an obstacle detection system in which a plurality of obstacle detection devices A and B are provided, the adjacent obstacle detection devices A and B generate spread spectrum signals based on different PN codes A and B, respectively. Therefore, interference of spread spectrum signals for detection of an obstacle between the adjacent obstacle detection devices A and B can be suppressed and the frequency of an error in detection of an obstacle by the obstacle detection system can be reduced.

In the above-described Embodiment 3, an example in which the obstacle detection devices A and B are arranged has been described. However, the above-described Embodiment 3 can also be applied to a system in which 3 or more obstacle detection devices are arranged. Obstacle detection devices which are not adjacent to each other may generate spread spectrum signals using the identical PN codes.

Embodiment 4

An obstacle detection system according to Embodiment 4 comprises a plurality of obstacle detection devices, each of the obstacle detection devices being connected via leakage transmission paths. Each of the devices includes synthesizing means for generating a superimposed signal containing an electric power and a spread spectrum signal for detection of an obstacle superimposed on each other. The synthesizing means transmits the superimposed signal to the adjacent device via the leakage transmission path. There is also provided a isolating means for isolating the electric power and the spread spectrum signal from the superimposed signal generated by this synthesizing means and supplying the electric power to the devices.

Figure 4:
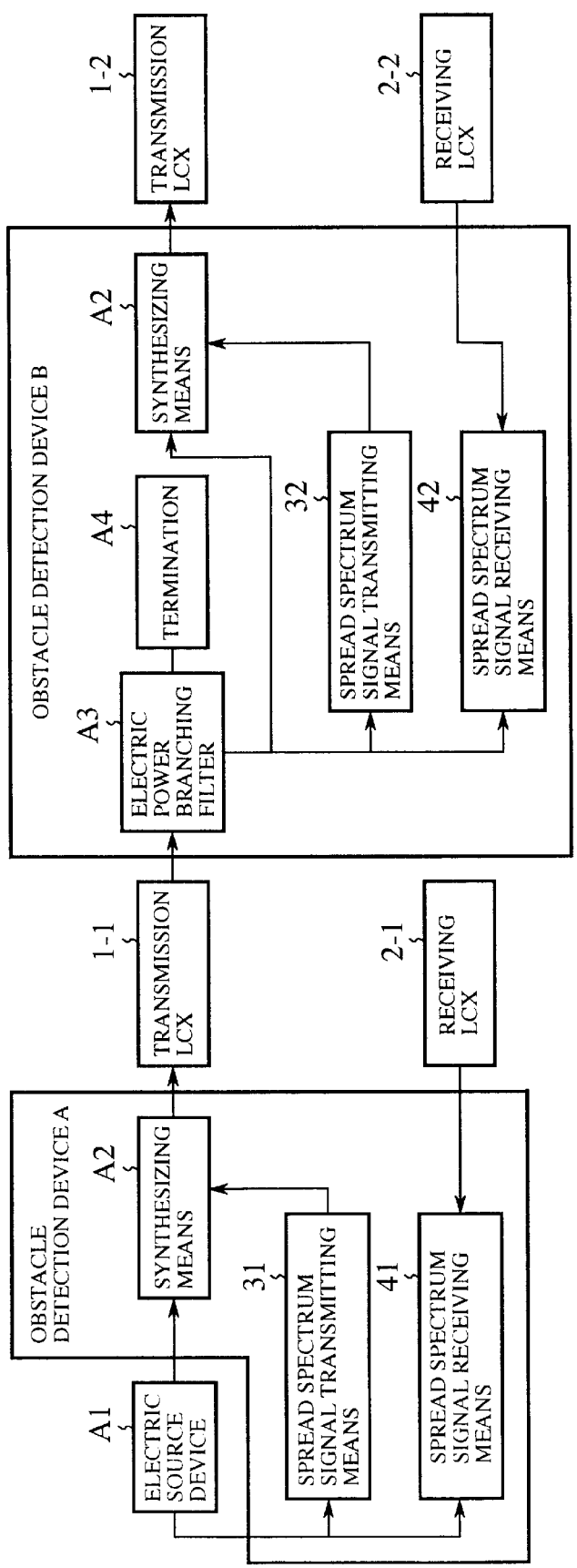
FIG. 4 is a block diagram showing a configuration of an obstacle detection device according to Embodiment 4 of the present invention.

FIG. 4 is a block diagram showing a construction of an obstacle detection system according to Embodiment 4 of the present invention. In FIG. 4, reference character A1 denotes an electric source device supplying an electric power to the obstacle detection devices A and B, and directly supplies an electric power to the spread signal transmitting means 31, the spread spectrum signal receiving means 41 and the synthesizing means A2 in the obstacle detection device A. Reference character A2 indicates a synthesizing means for synthesizing a spread spectrum signal for detection of an obstacle from the spread spectrum signal transmitting means 31 and an electric source voltage from the electric source device A1 and outputs the synthesized signal as a superimposed signal to the transmission LCX 1-1. Reference character A3 denotes an electric power branching filter (isolating means) for isolating the source voltage and the spread spectrum signal for detection of an obstacle from the above-described superimposed signal inputted into the obstacle detection device B via the transmission LCX 1-1 so as to supply the electric power to the obstacle detection device B. Reference character A4 denotes a termination connected to the electric power branching filter A3 and terminating the spread spectrum signal, generated by the obstacle detection device A and isolated from the superimposed signal by the electric power branching filter A3 ,so as to prevent the spread spectrum signal from being reflected to the transmission LCX 1-1. Otherwise, the obstacle detection devices A and B have a construction equivalent to that of the obstacle detection device described in Embodiment 1 and Embodiment 2. It should be noted that the same reference numerals or characters are attached to the same components as those in FIG. 3, and superfluous description is omitted.

In an obstacle detection system according to Embodiment 4, the obstacle detection devices A and B are connected to each other via the transmission LCX 1-1. Since an operation for detecting an obstacle by the obstacle detection devices A and B is similar to that of the above-described Embodiments, additional description is omitted. The characteristics of the obstacle detection system according to Embodiment 4 will be described. In an example shown in the figure, the obstacle detection device A receives the supply of an electric power directly from the electric source device A1. In the obstacle detection device A, the synthesizing means A2 generates a superimposed signal in which an electric source voltage from the electric source device A1 and a spread spectrum signal for detection of an obstacle generated by the spread spectrum signal transmitting means 31 are superimposed on each other and outputs the superimposed signal to the transmission LCX 1-1. This superimposed signal propagates to the electric power branching-filter A3 of the obstacle detection device B while radiating the spread spectrum signal for detection of an obstacle as a radio wave from a slot of the transmission LCX 1-1.

The electric power branching filter A3 isolates the electric source voltage of the electric source device A1 from the superimposed signal and supplies the electric power to the spread spectrum signal transmitting means 32, the spread spectrum signal receiving means 42 and the synthesizing means A2 located in the obstacle detection device B. The spread spectrum signal for detection of an obstacle generated by the spread spectrum signal transmitting means 31 and included in the superimposed signal is transmitted to the termination A4 so as to be prevented from being reflected to the transmission LCX 1-1 and causing interference with the spread spectrum signal of the obstacle detection device A.

In the case where another obstacle detection device is connected to the obstacle detection device B via the transmission LCX 1-2, the synthesizing means A2 located within the obstacle detection device B likewise generates a superimposed signal by superimposing an electric voltage and a spread spectrum signal for detection of an obstacle generated by the spread spectrum signal transmitting means 32 on each other and transmits the superimposed to the above-described other obstacle detection device via the transmission LCX 1-2. Thus, since the electric power can be supplied via the transmission LCX 1-1 or the LCX 1-2, it is not necessary to provide a plurality of electric source devices A1s.

As described above, according to Embodiment 4, the obstacle detection devices A and B which constitute an obstacle detection system are connected to each other via a leakage transmission path, the system including the synthesizing means A2 for generating a superimposed signal by superimposing an electric power and a spread spectrum signal for detection of an obstacle on each other and transmitting the superimposed signal to the adjacent obstacle detection device via the leakage transmission path. There is further provided an electric power branching filter A3 for isolating the electric power and the spread spectrum signal from the superimposed signal generated by the synthesizing means A2. Accordingly, an electric source can be supplied via the transmission LCX 1-1 or the LCX 1-2. It is not necessary to provide a plurality of electric source devices A1. Therefore the cost of the system can be reduced. Moreover, since housing space for the electric source device A1 is not required, the installation space of the device can be reduced.

It should be noted that adjacent obstacle detection devices may generate respective spread spectrum signals on the basis of different PN codes in the same manner as Embodiment 3 described above. It should be noted that the advantages provided by Embodiment 3 and Embodiment 4 are both provided.

Although an example is given of a arrangement where the obstacle detection devices A and B constitute an obstacle detection system, the construction of the above-described Embodiment 4 can be also applied to a system in which three or more obstacle detection devices are connected via LCX.

Embodiment 5

This Embodiment 5 is an obstacle detection system in which a plurality of obstacle detection devices are connected via leakage transmission paths and which comprise an information transmitting and receiving means for transmission and reception of detection information between the obstacle detection devices.

Figure 5:
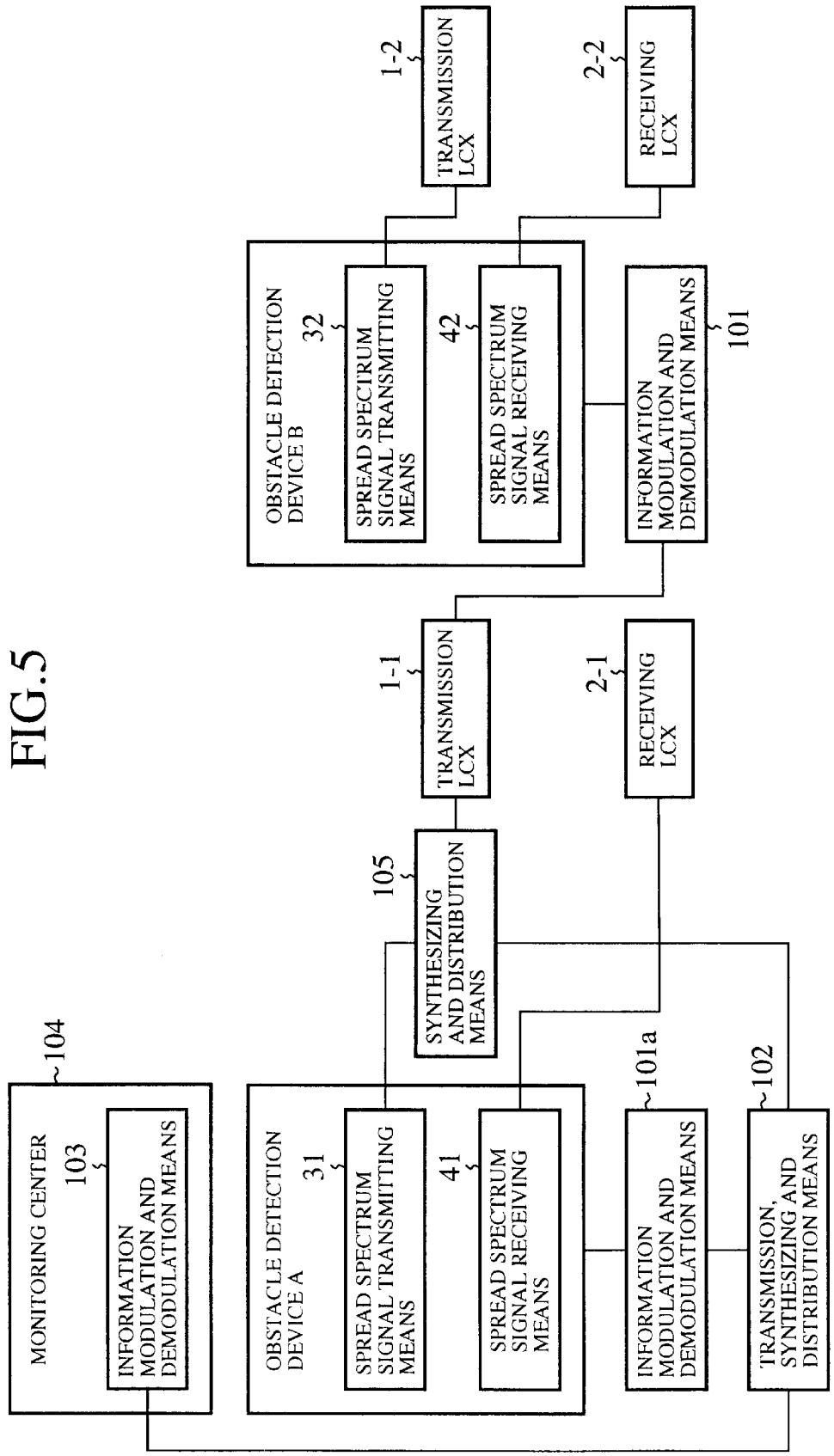
FIG. 5 is a block diagram showing a configuration of an obstacle detection device according to Embodiment 5 of the present invention.
Figure 6:
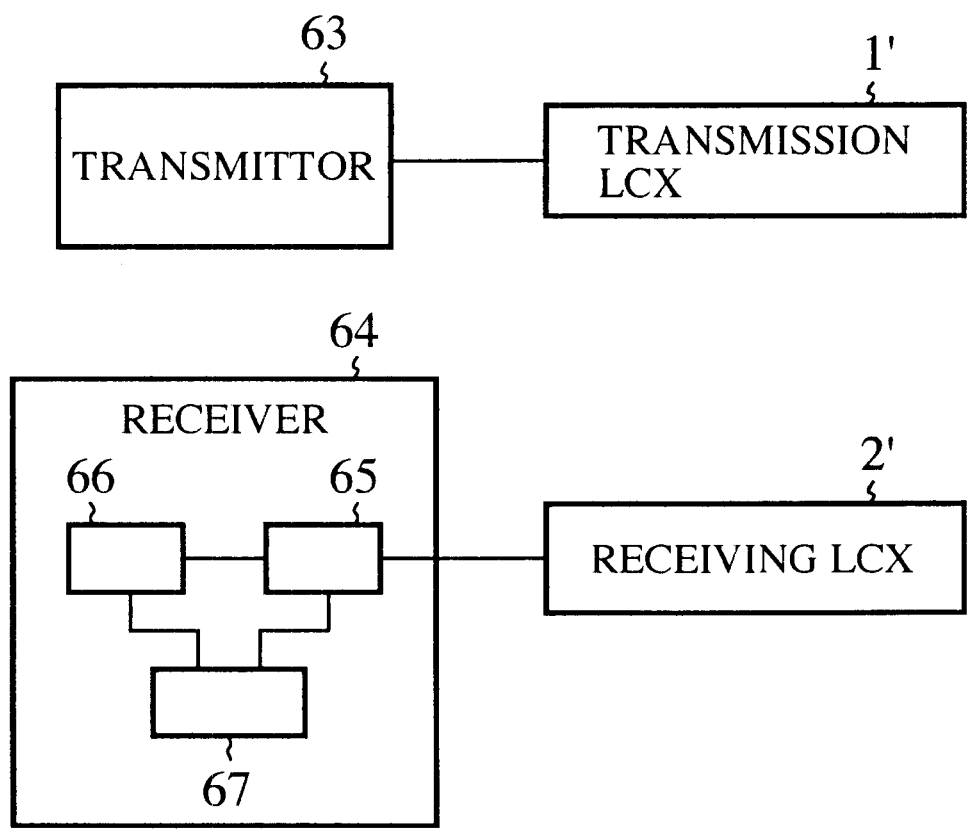
FIG. 6 is a block diagram showing a configuration of a related-art obstacle detection device.
Figure 7A:
FIGS. 7A–7H are graphical representations showing a transmitted waveform and a received waveform of a related-art obstacle detection device.
Figure 7B:
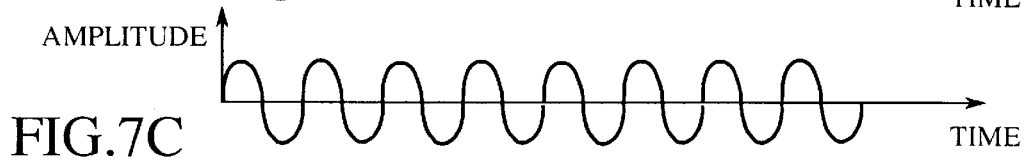
Figure 7C:
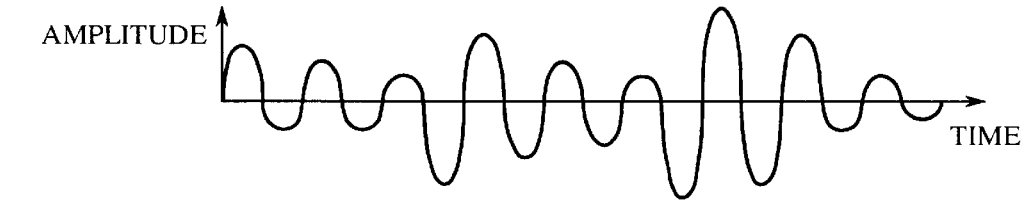
Figure 7D:
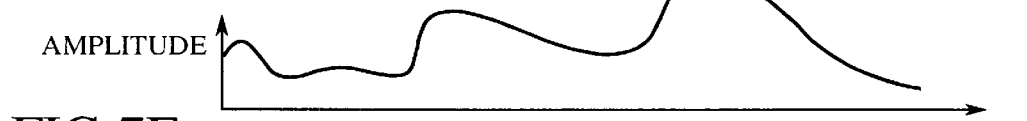
Figure 7E:
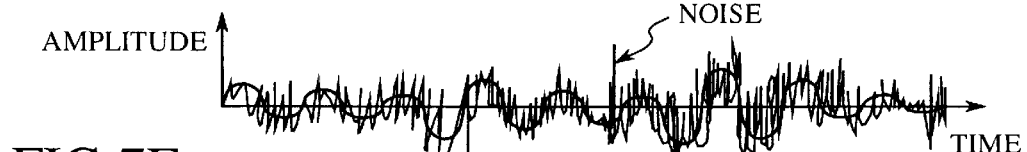
Figure 7F:
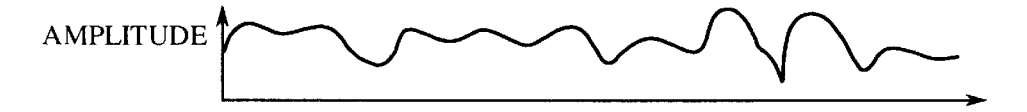
Figure 7G:
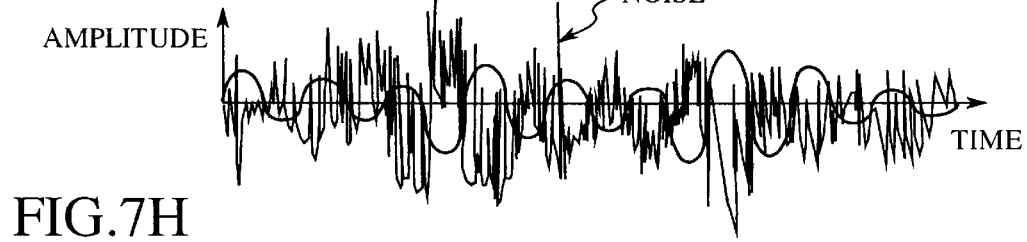
Figure 7H:
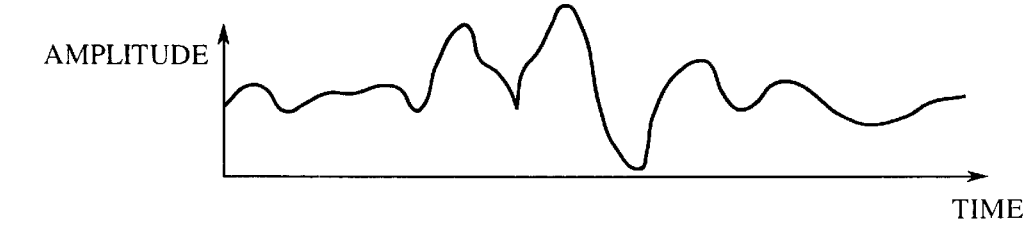

FIG. 5 is a block diagram showing a configuration of an obstacle detection system according to Embodiment 5 of the present invention. In FIG. 5, reference numeral 101 denotes an information modulation and demodulation means (information transmitting and receiving means) for modulating detection information relative to an obstacle detected by the obstacle detection device B, generating a modulated signal with a carrier wave frequency of a frequency different from a carrier wave frequency of a spread spectrum signal for detection of an obstacle generated by the obstacle detection device A, transmitting the generated modulated signal to the obstacle detection device A via the transmission LCX 1-1, and demodulating the modulated signal inputted from the obstacle detection device A via the transmission LCX 1-1 to reproduce the original detection information related to the obstacle. Reference numeral 101a denotes an information modulation and demodulation means (information transmitting and receiving means) for generating a modulated signal by modulating detection information related to the obstacle detected by the obstacle detection device A and transmitting the generated signal to a transmission, synthesizing and distribution means 102.

Reference numeral 102 indicates a transmission, synthesizing and distribution means (information transmitting and receiving means) connected to an information modulation and demodulation means 103 located within a monitoring center 104, the information modulation and demodulation means 101a and a synthesizing and distribution means 105, transmitting a modulated signal generated by the information modulation and demodulation means 101a to the information modulation and demodulation means 103 and appropriately distributing and transmitting the modulated signal from the information modulation and demodulation means 103 to the information modulation and demodulation means 101a or the synthesizing and distribution means 105. Further, the transmission, synthesizing and distribution means synthesizes signals from the information modulation and demodulation means 101a and the synthesizing and distribution means 105 and transmitting the synthesized signal to the information modulation and demodulation means 103. Reference numeral 103 denotes an information modulation and demodulation means (information transmitting and receiving means) provided in the monitoring center 104, for demodulating a modulated signal inputted from. the transmission, synthesizing and distribution means 102 to produce the original detection information related to the obstacle. The information modulation and demodulation means 103 also transmits information such as setting information originated by the monitoring center 104 for control of the devices A and B to the transmission, synthesizing and distribution means 102.

Reference numeral 104 indicates a monitoring center which monitors detection information related to an obstacle from the obstacle detection devices A and B constituting the system. The monitoring center 104 further provides setting to the obstacle detection devices A and B. Reference numeral 105 indicates a synthesizing and distribution means (information transmitting and receiving means) connected to the spread spectrum signal transmission means 31 located within the obstacle detection device A and to the transmission, synthesizing and distribution means 102. The synthesizing and distribution means synthesizes a spread spectrum signal for detection of an obstacle generated by the spread spectrum signal transmitting means 31 and a signal inputted from the transmission, synthesizing and distribution means 102, transmitting the synthesized signal to the obstacle detection device B via the transmission LCX 1-1, and also transmitting the modulated signal inputted from the information modulation and demodulation means 101 to the transmission, synthesizing and distribution means 102 via the transmission LCX 1-1. Moreover, the obstacle detection devices A and B are configured to have a construction equivalent to the obstacle detection device described in Embodiment 1 and/or Embodiment 2. It should be noted that the same reference characters and numerals are attached to the same components as those in FIG. 3 and additional description is omitted.

In an obstacle detection system according to Embodiment 5, the obstacle detection devices A and B are connected via the transmission LCX-1. Since a detection operation of the obstacle detection devices A and B is similar to that of the above-described Embodiments, additional description is omitted. The characteristics of an obstacle detection system according to Embodiment 5 will be described below.

Information related to an obstacle detected by the obstacle detection device B is transmitted to the information modulation and demodulation means 101. In this information modulation and demodulation means 101, the detection information related to an obstacle is modulated, and transmitted as a modulated signal to the synthesizing and distribution means 105 of the obstacle detection device A via the transmission LCX 1-1. At this time, the information modulation and demodulation means 101 modulates the detection information related to an obstacle to produce a modulated wave signal with a carrier wave of a frequency different from the carrier wave frequency of a spread spectrum signal generated. by the spread spectrum signal transmitting means 31 and 32 of the obstacle detection device A and B, respectively. With this, the modulated wave signal from the information modulation and demodulation means 101 does not affect the spread spectrum signal outputted to the transmission LCX 1-1 by the spread spectrum signal transmitting means 31. Moreover, even if the spread spectrum signal transmitting means 31 outputs a spread spectrum signal for detection of an obstacle to the transmission LCX 1-1, the synthesizing and distributing means 105 can receive the modulated signal from the information modulation and demodulation means 101.

When the synthesizing and distribution means 105 receives the modulated wave signal from the information modulation and demodulation means 101, the synthesizing and distribution means 105 transmits the modulated signal to the transmission, synthesizing and distribution means 102. The transmission, synthesizing and distribution means 102 transmits the modulated wave signal from the synthesizing and distribution means 105 to the information modulation and demodulation means 101a of the obstacle detection device A and/or the information modulation-and demodulation means 103 located within the monitoring center 104. The information modulation and demodulation means 101a and/or the information modulation and demodulation means 103 demodulate the modulated signal. The original detection information related to an obstacle obtained as a result of demodulation by the information modulation and demodulation means 103 is monitored by a manager attending to the monitoring center 104.

Setting information may be transmitted from the monitoring center 104 to the obstacle detection devices A and B via the transmission LCX 1-1. The setting information from the monitoring center 104 may include a delay time to be provided by the delaying means 13 described in Embodiment 2.

More specifically, when the manager attending to the monitoring center 104 inputs the setting information to the obstacle detection devices A and B using a setting input means or the like (not shown), the information modulation and demodulation means 103 modulates the setting information to produce a modulated wave signal with a carrier frequency different from the carrier wave frequency of the spread spectrum signal of the obstacle detection devices A and B, before transmitting the modulated signal to the transmission, synthesizing and distribution means 102.

The transmission, synthesizing and distribution means 102 transmits the modulated wave signal to the information modulation and demodulation means 101a and/or the synthesizing and distribution means 105. In the obstacle detection device A, the information modulation and demodulation means 101a demodulates the modulated wave signal so as to reproduce the original setting information from the monitoring center 104. The synthesizing and distribution means 105 synthesizes the modulated wave signal and the spread spectrum signal for detection of an obstacle of the obstacle detection device A and outputs the synthesized signal to the transmission LCX 1-1. Since the modulated wave signal has a carrier frequency different from that of the spread spectrum signal for detection of an obstacle, the modulated signal containing the setting information does not affect the obstacle detection operation of the obstacle detection device A. When the above-described modulated wave signal is inputted into the information modulation and demodulation means 101 of the obstacle detection device B via the transmission LCX 1-1, the information modulation and demodulation means 101 demodulates the input signal to reproduce the original setting information. With this, the obstacle detection device B is properly subjected to control by the monitoring center 104 using the setting information.

Thus, unlike the system according to the related art, the communication quality of the detection information is not deteriorated due to the circumstances in which the devices are installed. This is ensured by transmitting information related to an obstacle detected by the obstacle detection devices A and B via the transmission LCX 1-1. Therefore, secure transmission of detected information can be carried out. Moreover, since the present invention utilizes the existent configuration like the transmission LCX 1-1, it is advantageous from the viewpoint of cost.

As described above, according to Embodiment 5, the obstacle detection devices A and B are connected via the transmission LCX 1-1. Further, the information transmitting and receiving means is provided to include the information modulation and demodulation means 101 for allowing the devices to exchange information related to a detected obstacle between each other via the transmission LCX 1-1 and also to include the synthesizing and distribution means 105. Accordingly, the communication quality is not deteriorated by the circumstances in which the obstacle detection device is installed so that the secure transmission of detection information can be carried out. Moreover, since the present invention utilizes the existent configuration like the transmission LCX 1-1, the cost of the system providing the above-described effects can be reduced.

It should be noted that obstacle detection devices and obstacle detection systems according to Embodiments 1 through 5 find applications not only in obstacle detection on roads and railroad lines but also in obstacle detection in the surroundings of buildings and airports. A variety of modifications can be conceived without departing from the spirits and scope of the present invention.

What is claimed is:

1. An obstacle detection device comprising:

signal transmitting and receiving means for detecting an obstacle, comprising a first leaky transmission path on a transmitting side for radiating a signal for detection of an obstacle and a second leaky transmission path located opposite the first leaky transmission path and receiving the signal for detection of an obstacle;

spread spectrum signal transmitting means connected to one end of the first leaky transmission path, for generating a spread spectrum signal for detecting an obstacle based on a spread code and causing the first leaky transmission path to radiate the spread spectrum signal for detection of an obstacle; and spread spectrum signal receiving means connected to one end of the second leaky transmission path opposite the end to which the spectrum signal transmitting means is connected to the first leaky transmission path and comprising:

reference spread spectrum signal generation means for generating a reference spread spectrum signal based on a spread code of a code series identical to that used by the spread spectrum signal transmitting means;

correlation means for calculating a level of correlation between the reference spread spectrum signal generated by the reference spread spectrum signal generation means and the spread spectrum signal for detection of an obstacle received by the second leaky transmission path, based on a spread code phase-locked to the spread code of the spread spectrum signal for detection of an obstacle detected by the second leaky transmission path; and detection means for detecting an obstacle based on a change of a correlation level calculated by the correlation means.

2. The obstacle detection device according to claim 1, wherein the spread spectrum signal receiving means comprises time measurement means for measuring a spread spectrum signal propagation time period elapsing from when the spread spectrum signal transmitting means generates the spread spectrum signal for detection of an obstacle until said correlation means can calculate a correlation level of the reference spread spectrum signal and the spread spectrum signal for detection subsequent to generation by said reference spectrum signal generation means of the reference spread spectrum signal which is synchronized with the spread code of the spread spectrum signal for detection of an obstacle, and the detection means detects position of an obstacle existing within an obstacle detection area formed by the signal transmitting and receiving means for detecting an obstacle, based on the spread spectrum signal propagation time period measured by the time measurement means.

3. The obstacle detection device according to claim 1, wherein the spread spectrum signal receiving means includes delaying means for delaying phase of the spread code used by the reference spread spectrum signal generation means with respect to the spread spectrum signal for detection of an obstacle generated by the spread spectrum signal transmitting means.

4. An obstacle detection system comprising a plurality of obstacle detection devices according to claim 1, wherein adjacent devices generate spread spectrum signals based on different spread codes.

5. The obstacle detection device according to claim 4, wherein the obstacle detection devices are connected via the leaky transmission paths and include information transmitting and receiving means for transmission and reception of detection information between the obstacle detection devices.

6. An obstacle detection system comprising:

a plurality of obstacle detection devices according to 1, wherein the obstacle detection devices are connected via leaky transmission paths, each of the obstacle detection devices comprising:

synthesizing means for generating a superimposed signal by superimposing an electric power on the spread spectrum signal for detection of an obstacle and transmitting the superimposed signal to the adjacent device via the leaky transmission path, and isolating means for isolating the electric power and the spread spectrum signal from the superimposed signal generated by the synthesizing means, and supplying the electric power to the obstacle detection device.

7. The obstacle detection system according to claim 6, wherein adjacent devices generate spread spectrum signals based on different spread codes.

8. The obstacle detection device according to claim 6, wherein the obstacle detection devices are connected via the leaky transmission paths and include information transmitting and receiving means for transmission and reception of detection information between the obstacle detection devices.

* * * * *